United States Patent
Giacomin et al.

(10) Patent No.: US 10,823,034 B1
(45) Date of Patent: Nov. 3, 2020

(54) EXHAUST SYSTEM MIXER

(71) Applicant: Faurecia Emissions Control Technologies, USA, LLC, Columbus, IN (US)

(72) Inventors: Fabrice Giacomin, Gyeonggi-do (KR); Fabien Sudries, Gyeonggi-do (KR); Ludovic M. Geant, Rioz (FR); Vijaykumar Madegowda, Bangalore (IN)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/720,152

(22) Filed: Dec. 19, 2019

(51) Int. Cl.
| | |
|---|---|
| *F01N 3/28* | (2006.01) |
| *F01N 3/20* | (2006.01) |
| *B01F 5/06* | (2006.01) |
| *B01F 3/04* | (2006.01) |
| *B01F 5/04* | (2006.01) |
| *B01D 53/94* | (2006.01) |

(52) U.S. Cl.
CPC ....... *F01N 3/2892* (2013.01); *B01D 53/9431* (2013.01); *B01F 3/04049* (2013.01); *B01F 5/0473* (2013.01); *B01F 5/0688* (2013.01); *F01N 3/2066* (2013.01)

(58) Field of Classification Search
CPC . F01N 3/2892; F01N 3/2066; B01D 53/9431; B01D 3/04049; B01F 5/0473
USPC .................................................. 422/168, 176
See application file for complete search history.

(56) References Cited

U.S. PATENT DOCUMENTS

| | | | |
|---|---|---|---|
| 2015/0240692 A1* | 8/2015 | De Rudder | F01N 3/206 |
| | | | 422/168 |
| 2016/0273431 A1* | 9/2016 | Meier | F01N 3/2892 |
| 2019/0388851 A1* | 12/2019 | Moulieres | F01N 3/2066 |

\* cited by examiner

*Primary Examiner* — Tom P Duong
(74) *Attorney, Agent, or Firm* — Carlson, Gaskey & Olds, P.C.

(57) ABSTRACT

A mixer for a vehicle exhaust system includes an outer housing that defines an internal cavity, an inlet pipe that directs exhaust gas into the internal cavity, and an outlet baffle. The outer housing includes a doser opening configured to receive a doser. The outlet baffle directs a mixture of the exhaust gas and a reducing agent injected by the doser into a downstream exhaust component. A deflector deflects exhaust gas exiting the inlet pipe to mix with the reducing agent prior to entering the downstream exhaust component.

24 Claims, 3 Drawing Sheets

EXHAUST SYSTEM MIXER

TECHNICAL FIELD

This disclosure relates to a mixer for a vehicle exhaust system that mixes an injected reducing agent into an exhaust gas stream.

BACKGROUND

An exhaust system conducts hot exhaust gases generated by an engine through various exhaust components to reduce emissions and control noise. In one traditional configuration, the exhaust system includes an injection system that injects a NOx reduction fluid such as urea, NH3 carbonate, or any reduction gas or liquid that is a solution of urea and water for example, upstream of a selective catalytic reduction (SCR) catalyst. The injection system includes a doser or injector that sprays the injected fluid into the exhaust stream. The spray is typically concentrated in one area and then spreads out to mix with the exhaust gases. The urea from the injected fluid should be transformed as much as possible into ammonia ($NH_3$) before reaching the SCR catalyst. Certain packaging configurations can make this transformation more difficult.

SUMMARY

In one exemplary embodiment, a mixer for a vehicle exhaust system includes an outer housing that defines an internal cavity, an inlet pipe that directs exhaust gas into the internal cavity, and an outlet baffle. The outer housing includes a doser opening configured to receive a doser. The outlet baffle directs a mixture of the exhaust gas and a reducing agent injected by the doser into a downstream exhaust component. A deflector deflects exhaust gas exiting the inlet pipe to mix with the reducing agent prior to entering the downstream exhaust component.

In a further embodiment of the above, the inlet pipe has an inlet end and an outlet end that is non-coaxial with the inlet end.

In a further embodiment of any of the above, the outer housing has a non- circular cross-section.

In a further embodiment of any of the above, the non-circular cross-section comprises an ovoid cross-section, and wherein the outer housing has an upstream end and a downstream end, and including a cover that encloses the upstream end and wherein the outlet baffle is connected to the downstream end.

In a further embodiment of any of the above, the outlet baffle includes at least one primary outlet opening and, wherein the deflector deflects exhaust gas flow around at least a portion of the at least one primary outlet opening such that the mixture of exhaust gas and reducing agent flows along a path formed between an inner wall surface of the outer housing and the deflector prior to exiting the outer housing via the at least one primary outlet opening.

In a further embodiment of any of the above, the deflector comprises a panel having a first end that supports the inlet pipe and a distal second end that is positioned along an edge of the at least one primary outlet opening and which is spaced from the inner wall surface of the outer housing.

In another exemplary embodiment, an exhaust system includes a turbocharger outlet pipe, an exhaust component housing a substrate that is downstream of the turbocharger outlet pipe, and a mixer. The mixer includes an outer housing defining an internal cavity, a doser opening in the outer housing, and an inlet pipe that directs exhaust gas into the internal cavity. The inlet pipe is connected to the turbocharger outlet pipe such that there is no substrate upstream of the mixer. An outlet baffle is upstream of the substrate, and a deflector deflects exhaust gas flow along a path formed between an inner wall surface of the outer housing and the deflector. A doser is associated with the doser opening in the outer housing. The doser is configured to inject a reducing agent into the internal cavity.

In a further embodiment of any of the above, the outer housing has an upstream end and a downstream end, and the system includes a cover that encloses the upstream end and wherein the outlet baffle is connected to the downstream end. The inlet pipe comprises a curved pipe that is directly connected to the turbocharger outlet pipe, and the inlet end is associated with a pipe opening in the cover and the outlet end faces an inner wall surface of the outer housing.

These and other features of the present disclosure can be best understood from the following specification and drawings, the following of which is a brief description.

DETAILED DESCRIPTION

Figure 1:
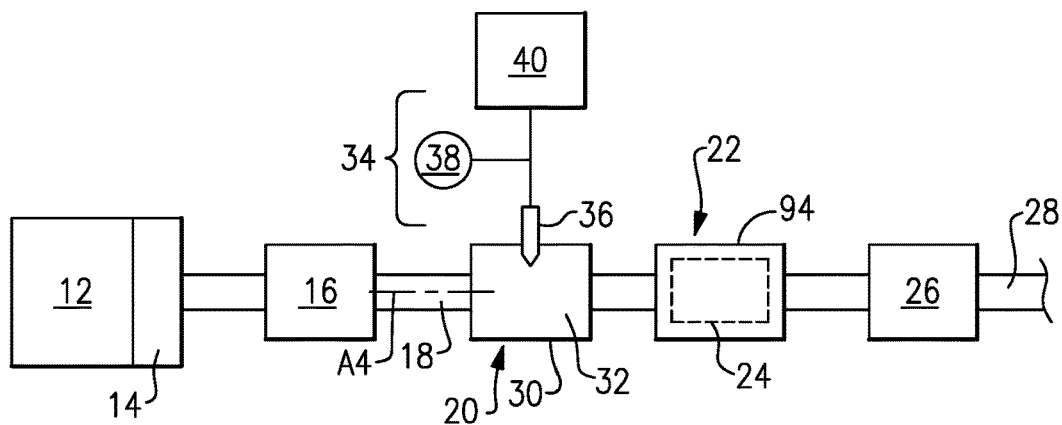
FIG. 1 is a schematic view of a vehicle exhaust system with a mixer incorporating the subject invention.

As shown in FIG. 1, a vehicle exhaust system 10 includes an engine 12 that generates exhaust gases that are conveyed through an exhaust manifold 14 to various downstream exhaust components. In one example configuration, a turbocharger 16 is located downstream of the exhaust manifold 14 and includes a turbocharger outlet pipe 18. A mixer 20 is positioned immediately downstream of the turbocharger outlet pipe 18 such that there are no exhaust component substrates upstream of the mixer 20. An exhaust component 22 having an exhaust after-treatment substrate 24 is positioned immediately downstream of the mixer 20. The mixer 20 is used to direct a mixture of a reducing agent and engine exhaust gases into the substrate 24, such as a selective catalytic reduction (SCR) substrate 24, for example. Downstream of the substrate 24 there may be various additional downstream exhaust components 26, which can include pipes, mufflers, resonators, etc. The downstream exhaust components 26 direct the exhaust gases to an outlet to atmosphere via a tailpipe 28. The components can be mounted in various different configurations and combinations dependent upon the type of application and available packaging space.

The mixer 20 includes an outer housing 30 that has an internal open cavity 32 that defines an exhaust gas flow path. An injection system 34 includes an injector or doser 36 that delivers a reducing agent, e.g., a NOx reduction fluid such as urea, NH3 carbonate, or any reduction gas or liquid that is a solution of urea and water, into the internal cavity 32 and upstream of the substrate 24. The operation of the doser is known, and any type of injector or doser can be used. The mixer 20 mixes engine exhaust gases with the injected reducing agent. The doser 36 is mounted to an outer peripheral surface of the outer housing 30. The doser 36 receives the reducing agent from a fluid supply 38 and a controller 40 controls injection of the fluid as known.

FIGS. 2-5 show the mixer 20 in more detail. The outer housing 30 includes a doser opening 50 that is configured to receive the doser 36. An inlet pipe 52 directs exhaust gas into the internal cavity 32. In one example, the inlet pipe 52 is directly connected to the turbocharger outlet pipe 18 in a close-coupled configuration such that there is no substrate upstream of the mixer 20. The benefits of this arrangement are described below. Optionally, the mixer 20 could also be located downstream of other exhaust components such as a diesel oxidation catalyst (DOC) or DOC combined with a diesel particulate filter (DPF). The mixer 20 includes an outlet baffle 54 that is upstream of the substrate 24, and a deflector 56 that deflects exhaust gas flow along a path 58 formed between an inner wall surface 48 of the outer housing 30 and the deflector 56. The deflector 56 deflects exhaust gas exiting the inlet pipe 52 to mix with the injected reducing agent such that a mixture of the exhaust gas and the reducing agent can exit the outlet baffle 54 and enter into an upstream face of the substrate 24. As discussed above, in one example, the substrate 24 comprises a SCR catalyst.

Figure 2:
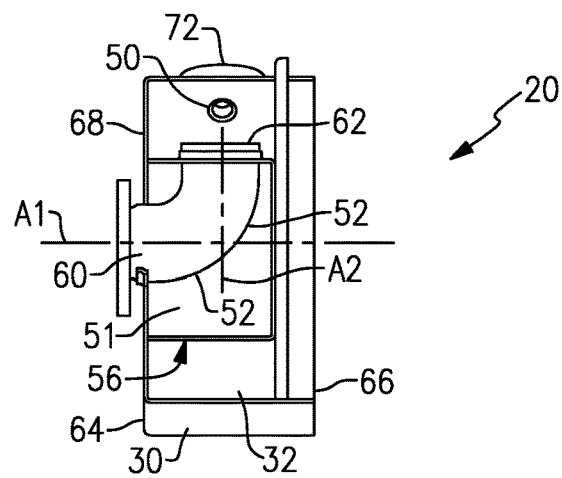
FIG. 2 is a schematic side view of the mixer of FIG. 1 with a portion of an outer housing removed to view an internal cavity.
Figures 3, 4:
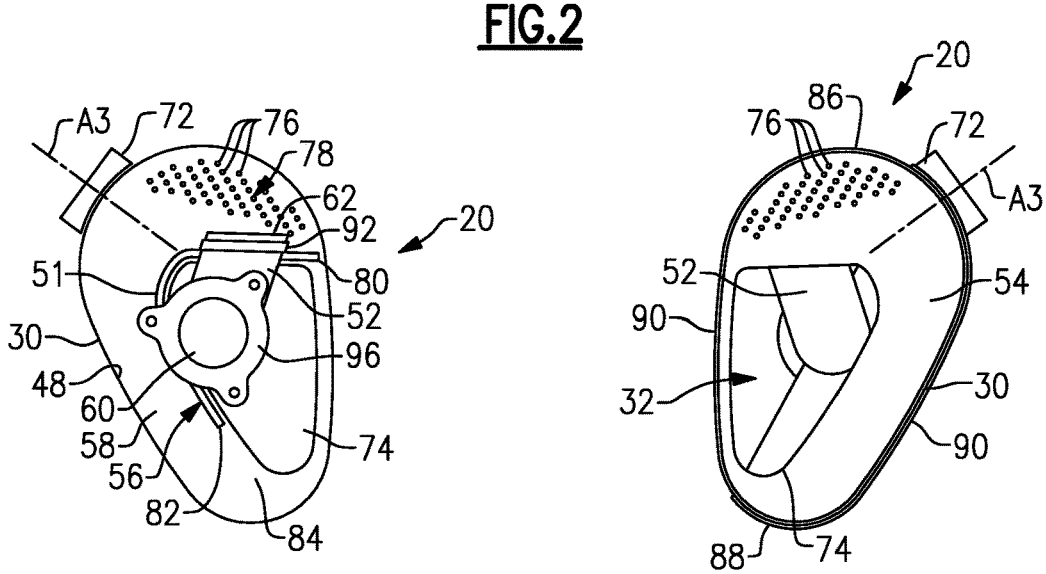
FIG. 3 is an inlet end view of the mixer of FIG. 2.
FIG. 4 is an outlet end view of the mixer of FIG. 2.
Figure 5:
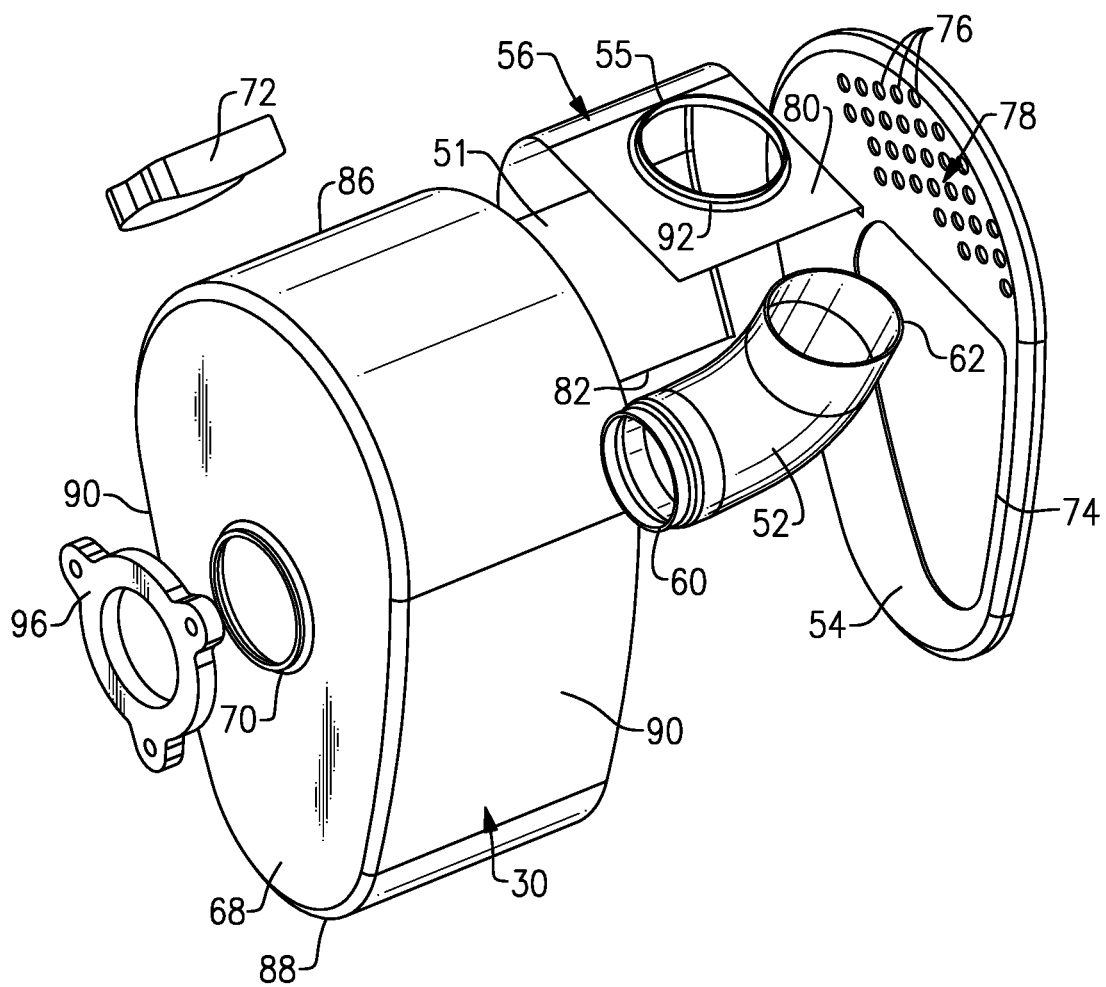
FIG. 5 is an exploded view of the mixer of FIG. 2.

As shown in FIG. 2, the inlet pipe 52 has an inlet end 60 and an outlet end 62 that is non-coaxial with the inlet end 60. In one example, the inlet pipe 52 comprises a curved circular pipe such as an elbow pipe with a circular cross-section. In other examples, the inlet pipe 52 can have an oval or elliptical cross-section. In this example, the inlet end 60 defines an inlet axis A1 and the outlet end 62 defines an outlet axis A2 that intersects the inlet axis A1 at an angle. In one example, the inlet axis A1 is perpendicular to the outlet axis A2. FIG. 3 shows an injection axis A3 for the doser 36 that is at an angle relative to the inlet axis A1. In one example, the injection axis A3 does not intersect the inlet axis A1. In one example, the inlet axis Al is coaxial with a turbocharger outlet axis A4 (FIG. 1). Optionally, a connection member, such as a tube or pipe, may be used to connect the turbocharger to the inlet pipe 52 at an angle, e.g. in a non-coaxial configuration.

The outer housing 30 has an open upstream end 64 and an open downstream end 66. A cover 68 encloses the upstream end 64 and the outlet baffle 54 is connected to the downstream end 66. The inlet end 60 of the inlet pipe 52 is associated with a pipe opening 70 in the cover 68 and the outlet end 62 of the inlet pipe 52 faces the inner wall surface 48 of the outer housing 30. The doser opening 50 is formed within the outer housing 30 at a location between the upstream 64 and downstream 66 ends. A doser mount structure or plate 72 is positioned at the doser opening 50 to connect to the doser 36 as known.

The outlet baffle 54 includes at least one primary outlet opening 74 and one or more optional secondary outlet openings 76 that are smaller than the at least one primary outlet opening 74. A majority of the flow exits the mixer 20 via the primary outlet opening 74. In one example, the secondary outlet openings 76 comprise a plurality of small openings that provide a perforated area 78 on the outlet baffle 54. The perforated area 78 improves flow uniformity index (UI) and reduces back pressure. The flow UI is used to quantify the flow distribution on the substrate inlet surface to indicate how the substrate is supplied in terms of flow, to see if the substrate is being used evenly in terms of flow to have uniform degradation and optimal efficiency.

The deflector 56 deflects exhaust gas flow around an outer edge of the primary outlet opening 74 and along the path 58 formed between the inner wall surface 48 of the outer housing 30 and the deflector 56. The deflector 56 thus prevents the exhaust gas leaving the inlet pipe 52 from directly exiting the mixer 20 via the primary outlet opening 74. In one example, the deflector 56 comprises a solid panel body 51 (FIG. 5) that extends across a section of the housing 30 between the upstream 64 and downstream 66 ends of the housing 30. The panel body 51 has a first end 80 that supports the inlet pipe 52 and a distal second end 82 that is positioned along an edge of the primary outlet opening 74. The distal second end 82 is spaced from the inner wall surface 48 of the outer housing by an air gap 84. The mixture of reducing agent and exhaust gas exits the path 58, flows around the second end 82 of the deflector 56 and into the gap 84, and then exits the mixer 20 via the primary outlet opening 74.

In one example, the outer housing 30 has a non-circular cross-section. In one example, the non-circular cross-section comprises an ovoid cross-section or egg-shaped cross-section. The ovoid cross-section has a curved wide end 86 and connects to a curved narrow end 88 via side wall sections 90 as shown in FIG. 4. The side wall sections 90 can be straight or curved. In one example, the doser opening 50 is formed within the curved wide end 86.

In one example, the deflector 56 is used to support the inlet pipe 52 within the internal cavity 32. In one example, the deflector 56 includes an opening 55 through which the outlet end 62 of the inlet pipe 52 extends. A flange 92 may be formed in the deflector 56 about the opening to further facilitate support for the inlet pipe 52. In one example, the inlet end 60 of the inlet pipe 52 is at the pipe opening 70 in the cover 68, and the pipe body curves from the inlet end 60 to the outlet end 62 that extends through the opening 55 in the deflector 56. Other inlet configurations, such as inlet baffles for example, could also be used. A flange 96 may be used to connect the inlet pipe 52 directly to the turbocharger outlet pipe 18. As such, the entirety of the inlet pipe 52 is located within the internal cavity 32.

Figure 6A:
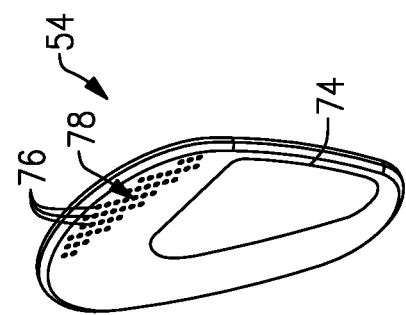
FIG. 6A is an isometric view of a baffle as used with the mixer of FIG. 2.
Figures 6B, 6C:
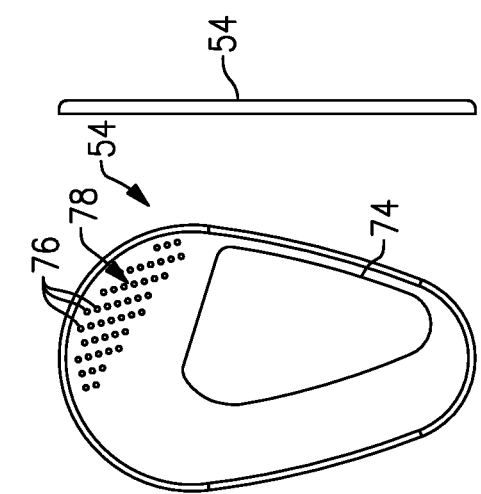
FIG. 6B is a front view of the baffle of FIG. 6A.
FIG. 6C is a side view of the baffle of FIG. 6A.

FIGS. 6A-6C show one example of an outlet baffle 54. In this example, the baffle 54 includes a single primary outlet opening 74 and a plurality of secondary outlet openings 76 that provide a perforated area 78 on the outlet baffle 54. In this example, the plurality of secondary outlet openings 76 comprise small circular openings.

Figure 7A:
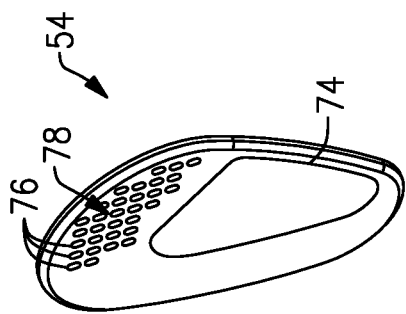
FIG. 7A is an isometric view of a baffle as used with the mixer of FIG. 2.
Figures 7B, 7C:
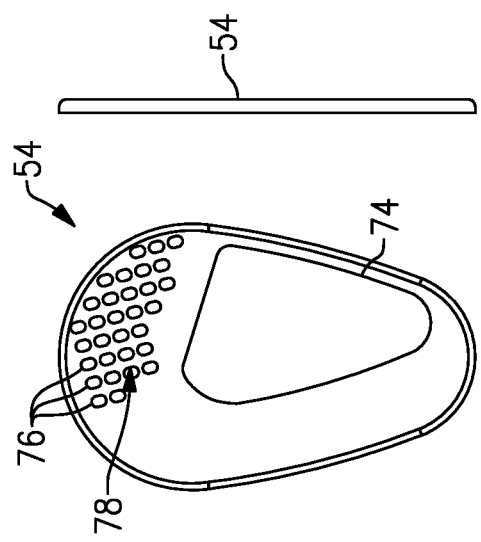
FIG. 7B is a front view of the baffle of FIG. 7A.
FIG. 7C is a side view of the baffle of FIG. 7A.

FIGS. 7A-7C show another example of an outlet baffle 54. In this example, the baffle 54 includes a single primary outlet opening 74 and a plurality of secondary outlet openings 76 that provide a perforated area 78 on the outlet baffle 54. In this example, the plurality of secondary outlet openings 76 comprise oval or elliptical openings, which are larger in size than the openings of FIG. 6B.

Figure 8A:
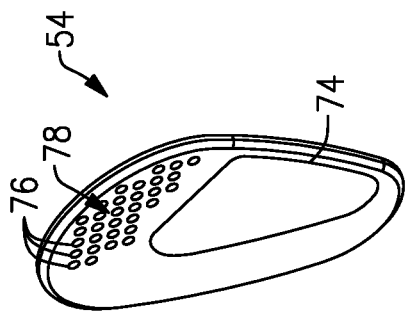
FIG. 8A is an isometric view of a baffle as used with the mixer of FIG. 2.
Figures 8B, 8C:
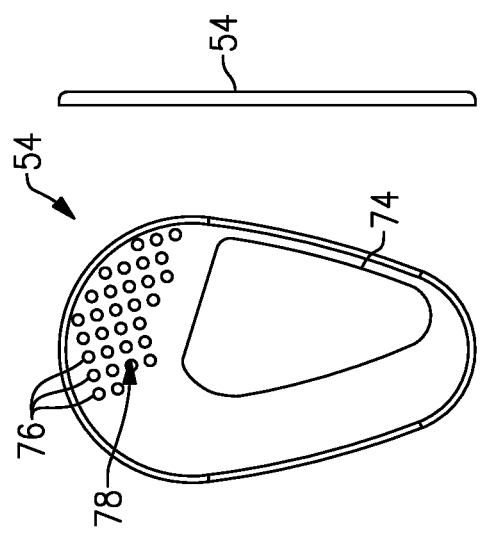
FIG. 8B is a front view of the baffle of FIG. 8A.
FIG. 8C is a side view of the baffle of FIG. 8A.

FIGS. 8A-8C show another example of an outlet baffle 54. In this example, the baffle 54 includes a single primary outlet opening 74 and a plurality of secondary outlet openings 76 that provide a perforated area 78 on the outlet baffle 54. In this example, the plurality of secondary outlet openings 76 comprise large circular openings, which are bigger in size than the openings of FIG. 6B.

The mixer 20 is directly attached to a housing 94 (FIG. 1) of the exhaust component 22 such that the substrate 24 is immediately downstream of the primary outlet opening 74. This provides for the mixer 20 to be in a close couple configuration to the SCR substrate 24 without having an upstream substrate. In one example, the substrate 24 has a non-round cross-section shape that is matched to an outer shape of the outer housing 30. Flow F through the inlet pipe 52 exits into the internal cavity 32, which provides a mixing chamber that is defined by the cover 68, the deflector 56, the peripheral wall of the outer housing 30, and the outlet baffle 54. The doser 36 is mounted to the doser plate 72 and sprays reducing agent into the mixing chamber to mix with exhaust gas exiting the inlet pipe 52. The direction of exhaust gas flow in the mixing chamber is initiated by the curve in the inlet pipe 52 in order to reduce back pressure. The deflector 56 directs flow into the path 58, while also supporting the inlet pipe 52 to keep the temperature in the inlet pipe 52 as high as possible. The flow exits the path 58 and the mixture flows through the primary outlet opening 74 in the outlet baffle 54. The position of the primary outlet opening 74 is defined to reach a target UI.

A primary benefit of the disclosed mixer is that a compact solution for a close-couple architecture is provided that can be directly connected to an outlet from a turbocharger without any intervening substrate. The proximity to the turbocharger is used to accelerate the activation of the SCR substrate such that DeNOx can be started as soon as possible. The activation of the SCR substrate depends on its temperature, and the activation temperature depends on the material and type of SCR substrate. A close-couple architecture assists in cold start DeNOx, as compared to a primary system (a main mixer and SCR) located downstream that will take more time to be activated due to the temperature drop due to the distance. Further, deposition formation is reduced, and the mixer is compatible with non-round substrates.

Although embodiments have been disclosed, a worker of ordinary skill in this art would recognize that certain modifications would come within the scope of this disclosure. For that reason, the following claims should be studied to determine the true scope and content of this disclosure.

The invention claimed is:

1. A mixer for a vehicle exhaust system comprising:
an outer housing defining an internal cavity that extends between an upstream end of the outer housing and a downstream end of the outer housing;
a doser opening in the outer housing configured to receive a doser;
an inlet pipe that directs exhaust gas into the internal cavity, wherein the inlet pipe has an inlet end and an outlet end that extends into the internal cavitiy;
an outlet baffle that directs a mixture of the exhaust gas and a reducing agent injected by the doser into a downstream exhaust component, wherein the outlet baffle is connected to the downstream end of the outer housing; and
a deflector positioned within the internal cavity that deflects exhaust gas exiting the inlet pipe to mix with the reducing agent prior to entering the downstream exhaust component.

2. The mixer according to claim 1, wherein the end and outlet end are non-coaxial, and including a cover connected to the upstream end of the outer housing, the cover comprising a panel with a pipe opening associated with the inlet end of the inlet pipe, and wherein the outlet end of the inlet pipe is supported by the deflector.

3. The mixer according to claim 2, wherein the inlet end is directly connected to a turbocharger outlet such that there is no substrate upstream of the mixer.

4. The mixer according to claim 1, wherein the inlet pipe comprises a curved pipe, and wherein the inlet end defines an inlet axis and the outlet end defines an outlet axis that intersects the inlet axis at an angle.

5. The mixer according to claim 4, wherein the inlet axis is coaxial with a turbocharger outlet axis.

6. The mixer according to claim 1, wherein the outer housing has a non-circular cross-section.

7. The mixer according to claim 6, wherein the non-circular cross-section comprises an ovoid cross-section, and including a cover that encloses the upstream and includes a pipe opening that receives the inlet end of the inlet pipe.

8. The mixer according to claim 7, wherein the outlet baffle includes at least one primary outlet opening and, wherein the deflector includes a panel body that deflects exhaust gas flow around at least a portion of the at least one primary outlet opening such that the mixture of exhaust gas and reducing agent flows along a path formed between an inner wall surface of the outer housing and the panel body of the deflector prior to exiting the outer housing via the at least one primary outlet opening.

9. The mixer according to claim 1, wherein the downstream exhaust component comprises a SCR component.

10. The mixer according to claim 1, wherein the deflector supports the outlet end of the inlet pipe.

11. The mixer according to claim 1, including a cover connected to the upstream end of the outer housing, and wherein the deflector comprises a solid panel body such that flow through the inlet pipe exits into the internal cavity, which provides a mixing chamber that is defined by the cover, the deflector, an inner wall surface of the outer housing, and the outlet baffle.

12. A mixer for a vehicle exhaust system comprising:
an outer housing defines an internal cavity, wherein the outer housing has a non-circular cross-section comprising an ovoid cross-section, and wherein the outer housing has an upstream end and a downstream end;
a doser opening in the outer housing configured to receive a doser;
an inlet pipe that directs exhaust gas into the internal cavity;
an outlet baffle that directs a mixture of the exhaust gas and a reducing agent injected by the doser into a downstream exhaust component, wherein the outlet baffle includes at least one primary outlet opening;
a deflector that deflects exhaust gas exiting the inlet pipe to mix with the reducing agent prior to entering the downstream exhaust component, wherein the deflector deflects exhaust gas flow around at least a portion of the at least one primary outlet opening such that the mixture of exhaust gas and reducing agent flows along a path formed between an inner wall surface of the outer housing and the deflector prior to exiting the outer housing via the at least one primary outlet opening;
a cover that encloses the upstream end and wherein the outlet baffle is connected to the downstream end;
wherein the deflector comprises a panel having a first end that supports the inlet pipe and a distal second end that is positioned along an edge of the at least one primary outlet opening and which is spaced from the inner wall surface of the outer housing.

13. A mixer for a vehicle exhaust system comprising:
an outer housing defines an internal cavity, wherein the outer housing has a non-circular cross-section, and wherein the non-circular cross-section comprises on ovoid cross-section, and wherein the outer housing has an upstream end and a downstream end, and including a cover that encloses the upstream end;
a doser opening in the outer housing configured to receive a doser;
an inlet pipe that directs exhaust gas into the internal cavity;
an outlet baffle that directs a mixture of the exhaust gas and a reducing agent injected by the doser into a downstream exhaust component, and wherein the outlet baffle is connected to the downstream end of the outer housing; and
a deflector that deflects exhaust gas exiting the inlet pipe to mix with the reducing agent prior to entering the downstream exhaust component, wherein the outlet baffle includes at least one primary outlet opening, and wherein the deflector deflects exhaust gas flow around at least a portion of the at least one primary outlet opening such that the mixture of exhaust gas and reducing agent flows along a path fanned between an inner wall surface of the outer housing and the deflector prior to exiting the outer housing via the at least one primary outlet opening, and wherein the outlet baffle includes one or more secondary outlet openings that arc smaller than the at least one primary outlet opening.

14. An exhaust system comprising:
a turbocharger outlet pipe;
an exhaust component housing a substrate that is downstream of the turbocharger outlet pipe;
a mixer including
an outer housing defining an internal cavity that extends between an upstream end of the outer housing and a downstream end of the outer housing,
a doser opening in the outer housing,
an inlet pipe that directs exhaust gas into the internal cavity, wherein the inlet pipe is connected to the turbocharger outlet pipe such that there is no substrate upstream of (he mixer, and wherein the inlet pipe has an inlet end and an outlet end that extends into the internal cavity,
an outlet baffle upstream of the substrate, wherein the outlet baffle is connected to the downstream end of the outer housing, and
a deflector positioned within the internal cavity that deflects exhaust gas flow along a path formed between an inner wall surface of the outer housing and the deflector; and
a doser associated with the doser opening in the outer housing, wherein the doser is configured to inject a reducing agent into the internal cavity.

15. The exhaust system according to claim 14, wherein the deflector comprises a panel body that deflects exhaust gas exiting the inlet pipe to mix with the reducing agent, and wherein the outlet baffle directs a mixture of the exhaust gas and the reducing agent into an upstream face of the substrate.

16. The exhaust system according to claim 15, wherein the substrate comprises a SCR catalyst.

17. The exhaust system according to claim 15, wherein the inlet end and outlet end are non-coaxial, and including a cover connected to the upstream end of the outer housing, the cover comprising a panel with a pipe opening associated with the inlet end of the inlet pipe, and wherein the outlet end of the inlet pipe is supported by the deflector.

18. The exhaust system according to claim 17, wherein the cover encloses the upstream end, and wherein the inlet pipe comprises a curved pipe that is directly connected to the turbocharger outlet pipe, and where the outlet end faces an inner wall surface of the outer housing.

19. The exhaust system according to claim 18, wherein the outlet baffle includes at least one primary outlet opening, and wherein the panel body of the deflector deflects exhaust gas flow around at least a portion of the at least one primary outlet opening and along the path formed between the inner wall surface of the outer housing and the panel body of the deflector prior to exiting the outer housing via the at least one primary outlet opening.

20. The exhaust system according to claim 14, wherein the outer housing has a non-circular cross-section, and optionally, wherein the non-circular cross-section comprises an ovoid cross-section.

21. The exhaust system according to claim 14, wherein the deflector supports the outlet end of the inlet pipe.

22. The exhaust system according to claim 14, including a cover connected to the upstream end of the outer housing, and wherein the deflector comprises a solid panel body such that flow through the inlet pipe exits into the internal cavity, which provides a mixing chamber that is defined by the cover, the deflector, the inner wall surface of the outer housing, and the outlet baffle.

23. An exhaust system comprising:
a turbocharger outlet pipe;
an exhaust component housing a substrate that is downstream of the turbocharger outlet pipe;
a mixer including
an outer housing defining an internal cavity
a doser opening in the outer housing,
an inlet pipe that directs exhaust gas into the internal cavity, wherein the inlet pipe is connected to the turbocharger outlet pipe such that there is no substrate upstream of the mixer, and wherein the inlet pipe has an inlet end and an outlet end that is non-coaxial with the inlet end,
an outlet baffle upstream of the substrate, wherein the outer housing has an upstream end and a downstream end, and including a cover that encloses the upstream end and wherein the outlet baffle is connected to the downstream end, and wherein the inlet pipe comprises a curved pipe that is directly connected to the turbocharger outlet pipe, and where the inlet end is associated with a pipe opening in the cover and the outlet end faces an inner wall surface of the outer housing, and
a deflector that deflects exhaust gas flow alone a path formed between an inner wall surface of the outer housing and the deflector, wherein the deflector deflects exhaust gas exiting the inlet pipe to mix with a reducing agent, and wherein the outlet baffle directs a mixture of the exhaust gas and the reducing agent into an upstream face of the substrate, wherein the outlet baffle includes at least one primary outlet opening, and wherein the deflector deflects exhaust gas flow around at least a portion of the at least one primary outlet opening and along the path formed between the inner wall surface of the outer housing and the deflector prior to exiting the outer housing via the at least one primary outlet opening, wherein the deflector comprises a panel having a first end that supports the inlet pipe and a distal second end that is positioned along an edge of the at least one primary outlet opening and which is spaced from the inner wall surface of the outer housing, and a doser associated with the doser opening in the outer housing, wherein the doser is configured to inject the reducing agent into the internal cavity.

24. A exhaust system comprising:

a turbocharger outlet pipe;

an exhaust component housing a substrate that is downstream of the turbocharger outlet pipe;

a mixer including an outer housing defining an internal cavity, a doser opening in the outer housing, an inlet pipe that directs exhaust gas into the internal cavity, wherein the inlet pipe is connected to the turbocharger outlet pipe such that there is no substrate upstream of the mixer, and wherein the inlet pipe has an inlet end and an outlet end that is non-coaxial with the inlet end, an outlet baffle upstream of the substrate, wherein the outer housing has an upstream end and a downstream end, and including a cover that encloses the upstream end and wherein the outlet baffle is connected to the downstream end, and wherein the inlet pipe comprises a curved pipe that is directly connected to the turbocharger outlet pipe, and where the inlet end is associated with a pipe opening in the cover and the outlet end faces an inner wall surface of the outer housing, and a deflector that deflects exhaust gas flow along a path formed between an inner wall surface of the outer housing and the deflector, and wherein the deflector deflects exhaust gas exiting the inlet pipe to mix with the reducing agent, and wherein the outlet baffle directs a mixture of the exhaust gas and the reducing agent into an upstream face of the substrate, and wherein the outlet baffle includes at least one primary outlet opening, and wherein the deflector deflects exhaust gas flow around at least a portion of the at least one primary outlet opening and along the path formed between the inner wall surface of the outer housing and the deflector prior to exiting the outer housing via the at least one primary outlet opening; and a doser associated with the doser opening in the outer housing, wherein the doser is configured to inject a reducing agent into the internal cavity, wherein the outlet baffle includes one or more secondary outlet openings that are smaller than the at least one primary outlet opening.

\* \* \* \* \*